United States Patent

[11] 3,607,383

| [72] | Inventor | Harry Clarence de Vroome<br>London, England |
| --- | --- | --- |
| [21] | Appl. No. | 801,804 |
| [22] | Filed | Feb. 24, 1969 |
| [45] | Patented | Sept. 21, 1971 |
| [73] | Assignee | Ayrodev Processes Limited<br>Poplar, England |
| [32] | Priority | Oct. 8, 1968 |
| [33] | | Great Britain |
| [31] | | 47626/68 |

[54] METHOD FOR TREATING DEFECTIVE WINDINGS OF ROTATING ELECTRICAL MACHINERY
5 Claims, No Drawings

[52] U.S. Cl. .................................................. 117/213,
117/2, 117/218, 117/232, 252/152

[51] Int. Cl. ...................................................... B44d 1/18
[50] Field of Search ............................................ 117/213,
232, 218, 72, 2; 252/152

[56] References Cited
UNITED STATES PATENTS
2,804,404  8/1957  Thiessen ........................ 117/213

*Primary Examiner*—William L. Jarvis
*Attorney*—Kelman and Berman

ABSTRACT: Locally defective insulation in the winding of a rotating electric machine is scanned with a megohmmeter to find the defective areas which are then cleaned with a solution of a cationic surfactant in an organic solvent until insulation resistance reaches a stable maximum value. The solvent is permitted to evaporate, preferably at elevated temperature, and the defective area is treated with insulating varnish to restore the insulation.

METHOD FOR TREATING DEFECTIVE WINDINGS OF ROTATING ELECTRICAL MACHINERY

The present invention relates to a method of treating defective windings of rotating electrical machinery, and especially to a method of salvaging and revitalizing rotating electrical machinery the electrical insulation of which has become impaired by such factors as operation under adverse conditions of temperature, exposure to severe conditions of humidity and contamination by, for example, corrosive, oily and carbonaceous deposits.

Hitherto, when it has been ascertained that the electrical insulation resistance of such equipment has been adversely affected, usually by measurement of the overall resistivity of the electrical windings, it has been the general practice to subject the defective part to the action of cleansing agents, which themselves may leave oily or greasy films upon volatilization of their solvent vehicles, and then apply electrically insulating varnishes to resuscitate the insulation after removal of the solvent by volatilization, and thermal curing. Such prior processes have proved unsatisfactory as, instead of locating the precise regions of relatively low electrical insulation and ensuring the substantially complete removal of, for example, carbon deposits, they rely on an overall treatment in which weak points may have only been temporarily strengthened. Furthermore, such overall treatments cannot ensure that the reapplied insulation varnish has been dried and cured to an optimum level of electrical insulation resistance.

It is a primary object of this invention to provide a method of treating defective windings of rotating electrical machinery which is more economical and efficient than the prior methods indicate above.

According to the present invention I provide a method of treating defective windings of rotating electrical machinery, which includes examining the defective windings with an instrument capable of measuring electrical insulation resistance of the order of hundreds or thousands of megohms and locating thereby regions of relatively low electrical insulation resistance, applying sufficient of a cleaning composition to the defective winding preferentially to the said low electrical insulation resistance regions until the said instrument indicates that a constant value of maximum electrical insulation resistance has been obtained, the said cleaning composition containing a cationic surfactant comprising an organic acid salt of a primary, secondary, tertiary or quaternary amine containing a hydrocarbon moiety of not less than 12 carbon atoms, a hydroxy aromatic acid or ester thereof, and at least one organic solvent, and allowing the solvents to volatilize, thereby cleaning the windings and forming a protective film thereon.

The said cleaning compositions are disclosed in my simultaneously filed Application No. 801,778.

The said low electrical insulation resistance regions may be treated with the cleaning composition by spraying, swabbing or dipping.

A suitable instrument capable of measuring electrical insulation resistance of the order of thousands of megohms is marketed under the trade name "Tera-ohmeter" and is familiar to those skilled in the art.

The said solvents may be allowed to volatilize under ambient conditions or by appropriate heating, preferably in an oven of the kind disclosed in our copending U.K. Application No. 45284/68.

Preferably an electrically insulating varnish or other coating is then applied, e.g. by spraying, to the said protective film. It is expedient to apply at least two coatings of electrically insulating varnish and the efficacy of drying of each coat may conveniently be checked by means of the said instrument.

I believe that the said cleaning composition has the effect of removing substantially all oily or greasy deposits, preferentially wetting the aforementioned regions of low resistivity and thereby replacing any surface moisture, dispersing any carbon aggregates and rapidly breaking down heavily encrusted carbon deposits, and after volatilization of the solvent vehicle, leaving a continuous film of protective hydrophobic surfactant on the cleansed windings.

Although the process of the present invention may be employed to restore the electrical insulation resistance of electrical windings of machinery which has been dismantled and removed from its original site, the process is primarily directed towards the in situ restoration of rotating electrical machinery.

EXAMPLE

A 600 kw. DC armature, 3½ tons in weight, coupled to a commutator 1 foot 6 inches long and 2 feet 6 inches in diameter was scanned by a megohmmeter capable of measuring up to 250 megohms and found to have three zones of negligible electrical resistance, each of approximately 6 inch diameter.

These zones and their immediately surrounding areas were sprayed with the following composition until the overall resistance of the armature windings had risen to a value of 20 megohms.

Dioleate salt of -N-stearyl-n-propylene-1,3-diamine (marketed under the Trade Name "Duomeen TDO")    22 parts by weight.
Methyl salicylate    15 parts by weight.
White Spirit    250 parts by weight.
Dipentene    75 parts by weight.

This value for electrical insulation resistance was maintained on standing for 24 hours.

Subsequent spray application of two coats of an electrically insulating varnish, based on an oil modified pentaerythritol alkyd, resulted in a maintained electrical insulation of 20 megohms at 500 volts.

What I claim is:

1. A method of treating defective windings of rotating electrical machinery, which includes examining the defective windings with an instrument capable of measuring electrical insulation resistance of the order of hundreds or thousands of megohms and locating thereby regions of relatively low electrical insulation resistance, applying sufficient of a cleaning composition to the defective winding preferentially to the said low electrical resistance regions until the said instrument indicates that a constant value of maximum electrical insulation resistance has been obtained, the said cleaning composition containing a cationic surfactant comprising an organic acid salt of a primary, secondary, tertiary or quaternary amine containing a hydrocarbon moiety of not less than 12 carbon atoms, a hydroxy aromatic acid or ester thereof, and at least one organic solvent, and allowing the solvents to volatilize, thereby cleaning the windings and forming a protective film thereon.

2. Method according to claim 1, wherein the said low electrical resistance regions are treated with the cleaning composition by spraying, swabbing or dipping.

3. Method according to claim 1, wherein the said solvent is/are allowed to evaporate by application of heat.

4. Method according to claim 3, wherein at least one coating of varnish is applied to the said protective film.

5. The article prepared by the method of claim 4.